Patented Aug. 17, 1954

2,686,739

UNITED STATES PATENT OFFICE 2,686,739

INSULATED ELECTRICAL CONDUCTOR AND METHOD OF PRODUCING SAME

Charles F. Kohl, Jr., Midland, Mich., assignor to Dow Corning Corporation, Midland, Mich., a corporation of Michigan No Drawing. Application May 31, 1951,
Serial No. 229,257

2 Claims. (Cl. 117—128.4)

This invention relates to thermally stable resins which are composed of certain polyhydric alcohols and certain carboxylic acids and to their method of preparation.

One of the perennial problems in the coating art, such as paint coatings and electrical coatings has been the production of a thermally stable resin which can be readily applied to bare metal and which has a maximum of stress-strain properties. Thermally stable means the material will withstand temperatures for prolonged periods of time in excess of 200° C. By stress-strain properties is meant maximum flexibility, toughness, abrasion resistance and solvent resistance. There are many resins which will satisfy various of these requirements but heretofore there has been no known material which could meet all of the above specifications.

For example, silicone resins have excellent thermal stability, but their stress-strain requirements do not come up to those of organic resins such as alkyds or phenolformaldehyde resins. Organic resins such as the above named have excellent stress-strain properties but lack thermal stability.

It is the primary object of this invention to provide organic resins which have a thermal stability approaching that of silicone resins and which at the same time retain the stress-strain properties of conventional organic coating agents. Another object is to provide a method of preparing high temperature magnet wire enamel. Another object is to prepare high temperature paint vehicles. Another object is to provide a Class H magnet wire enamel for fractional horsepower motors, for electronic equipment and for other electrical equipment wherein the space factor is critical. Other objects and advantages will be apparent from the following description.

In accordance with this invention, glycerine or pentaerythritol is reacted with an aryl polycarboxylic acid selected from the group consisting of terephthalic, isophthalic, diphenic, stilbenedicarboxylic acid, tolanedicarboxylic acid and dibenzyldicarboxylic acid

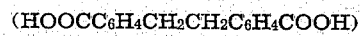
(HOOCC$_6$H$_4$CH$_2$CH$_2$C$_6$H$_4$COOH)

in such proportion that the ratio of hydroxyl groups to carboxyl groups ranges from 4:1 to .9:1, in the presence of a solvent selected from the group consisting of tertiary amines, dialkyl-substituted amides, ketones and esters of fatty acids, diesters, diethers and ester-ethers of ethylene glycol and polyethylene glycols, said solvent being present in amount sufficient to prevent gelation of the resins during the reaction.

It has been found that when the reaction of the above acids and alcohols is conducted in the presence of the above solvents thermally stable, flexible, hard resins are produced. In general, the reaction above described is carried out until substantially the theoretical amount of water has been removed. The preferred temperatures are above 80° C.

In order to obtain the maximum benefits from the resins of this invention, it is necessary that they be cured at a temperature of at least 200° C. This after-cure produces annealing of the resin film and eliminates the inherent brittleness of the alcohol-acid resins. The time of curing varies with the temperature and with the thickness of the resin coating. For example, at 200° C. the annealing time may take one hour or more while at 450° C. one minute is usually sufficient. Unless the resins are so heated, they are brittle and are of relatively little use as coating materials where flexibility is required. At high temperatures say 500° C. to 600° C. very short annealing times are employed to prevent deterioration of the resin.

Alternative methods for preparing the resins of this invention are disclosed and claimed in the copending application of John T. Goodwin, Serial No. 229,259, filed May 31, 1951, entitled "Resins and Their Production" and assigned to the assignee of this invention. An additional method involves employing the acyl halides of the above acids. These are reacted with the alcohol to form resins equivalent to those described herein.

The acids employed herein may be monocyclic aryl acids such as paraphthalic and metaphthalic acids, polycyclic acids such as diphenic acids, stilbenedicarboxylic acids, tolanedicarboxylic acids and dibenzyldicarboxylic acids. It should be understood that in the above acids, the position of the carboxyl groups relative to each other is not critical except that in the case of dicarboxylic monocyclic aryl acids the carboxyl groups can not be ortho to each other.

The solvents employed in the method of this invention should have a boiling point of at least 190° C. and preferably should be essentially immiscible with water. Specific examples of solvents which are operative herein are tertiary amines such as quinoline, isoquinoline, tributylamine, triisobutylamine and triamylamine; ketones such as isophorone, acetopheonone and acetonylacetone; dialkyl-substituted amides such as dimethylformamide, diethylformamide and dimethyl acetamide; esters of fatty acids such as 2 ethylhexylacetate, laurylacetate, 2 ethylhexylbutyrate; and diesters, diethers and ester-ethers of ethylene glycol and polyethyleneglycols such as butyl Carbitol acetate, butyl Cellosolve acetate, amyl Carbitol acetate, diethyleneglycoldipropionate, phenoxyethyleneglycolacetate and diethyl Carbitol.

If desired the resins of this invention may be modified by including therein from 0.1 to 35 per cent by weight, based on the weight of alcohol-polycarboxylic acid ester, of a fatty acid of at least 8 carbon atoms. The fatty acid is preferably added along with the alcohol. If more than 35 per cent by weight of fatty acid is included, the thermal stability of the resin is deleteriously affected and they will not fulfill the requirements of the high temperature resins of this invention.

Typical fatty acids which may be employed herein are stearic acid, 2-ethylhexoic acid, linseed fatty acid, soybean fatty acid, castor oil acids, coconut oil acids, tung oil acids, Chinawood oil acids and tall acids. The above acids may be added per se or they may be employed as the natural glyceride.

Further modification may be obtained by incorporating from .1 to 35 weight per cent based upon the combined weight of alcohol and aryl polycarboxylic acid of dicarboxylic aliphatic acids such as adipic, succinic, sebacic, fumaric, maleic, azelaic.

In addition, the resins of this invention may be modified by incorporating therein partially hydrolyzed and partially condensed organic siloxanes. The siloxanes may be employed in amount from 0.1 to 85 per cent by weight of the resin composition. The higher silicone containing materials are prepared by employing partially condensed siloxanes with a high degree of polymerization. The siloxanes employed herein are those corresponding to the formula $$R_m SiX_n O_{\frac{4-m-n}{2}}$$

where R is a radical of the group alkyl, monocyclicaryl, alkoxy and aryloxy, $m$ has a value from 0 to 2, $n$ has a value from .05 to 3 and X is selected from the group consisting of alkoxy, aryloxy and silicon bonded hydroxyl radicals. There is a minimum of .5 oxygen atoms per Si atom.

The above defined siloxanes may be prepared by partially hydrolyzing silanes of the formula $R_n SiX_{4-n}$ where R and X are as above defined and $n$ has a value from 0 to 4. The preferred method is that defined in the copending application of Lawrence A. Rauner, Serial No. 137,480, filed January 7, 1950.

The above siloxanes are preferably soluble in the reaction mixture. It is often advantageous to employ solvents such as cresylic acid and toluene in addition to the above defined solvents, to aid in the solution of the siloxane. These siloxanes are polymeric materials in which some of the silicon atoms are linked through oxygen atoms to other silicon atoms and the remaining valences of the silicon are satisfied with hydrocarbon radicals, halogenated hydrocarbon radicals or functional groups such as the alkoxy, aryloxy and hydroxy radicals. The partial hydrolyzates employed herein vary all the way from mobile liquids to viscous nonflowing resins. The lowest polymer is a dimer of the type

where the valences are satisfied by R and X radicals.

Specific examples of such siloxanes are partially hydrolyzed phenylmethylsiloxane, monophenylsiloxane, dimethylsiloxane, tetracresoxysiloxane, tetraethoxysiloxane, or partially hydrolyzed copolymers thereof together with hydroxylated materials which are free of alkoxy or aryloxy groups such as for example a siloxane resin containing phenylmethyl, monomethyl and monophenylsiloxane units which resin also contains 1 per cent by weight silicon bonded hydroxyl groups.

The above partially hydrolyzed or partially condensed siloxanes are incorporated in the resins of this invention preferably after the complete removal of the theoretical amount of water from the reaction of the alcohol with the acid. The reaction between the siloxane and the alcohol acid resins is carried out at a temperature preferably from 180° C. to 260° C. and continued until a compatible mixture is obtained. It is often advantageous to continue the reaction beyond the compatible step until substantially the theoretical amount of by-product is removed, that is, until substantially the theoretical amount of alcohol in the case of alkoxy or aryloxy siloxanes or substantially the theoretical amount of water in the case of hydroxylated siloxanes.

In those cases in which modification with either the aliphatic acids or the siloxane or mixtures thereof is desired, the alcohol and polycarboxylic acids are employed in amount such that the ratio of OH to COOH radicals is from 4:1 to 1.001:1, that is, there is excess alcohol hydroxyls free to react with the fatty acid or the siloxane functional groups.

The resins of this invention both modified and unmodified are excellent for use as magnet wire enamel. They are readily coated on copper wire by simply passing the wire through a solution of the resin and thereafter running it through a heated tower. Normally, the wire is passed through at a rate of from 5 to 18 feet per minute at a temperature of 350° C. to 500° C. The film on the wire emerging from the tower is cured to a tack free, hard, flexible state.

The excellence of these materials is illustrated by a scrape hardness of from 15 to 33 ounces when cured and they retain this scrape hardness essentially unchanged after 24 hours at 100 per cent relative humidity at 35° C. The scrape hardness is relatively unchanged after 1 hour in toluene at 25° C. They are also characterized by a high flow point which is shown by the standard test of crossing two wires and applying a given load thereto, and then raising the temperature until the wire short circuits. The resins of this invention have flow points from 250° C. to greater than 360° C. This is a critical item in the use of magnet wire since it enables the material to be used at elevated temperatures without short circuiting the electrical device. The excellent thermal stabiilty of the resins of this invention is shown by the fact that they have a craze life of at least 500 hours at 250° C. on bare copper wire. In this test, the coated wire is wound around a 100 mil mandrel and heated at the prescribed temperature until the resin begins to peel. The craze life is expressed in hours at that temperature.

The above tests hold generally with both the aliphatic acid and silicone modified materials. It should be understood of course that the essential characteristic of the resins of this invention insofar as their use for coating materials is concerned is not dependent upon any modification. The modification, however, may improve special properties such as wetting of a particular surface or may render the resins more compatible with other types of coating agents.

Another use for the materials of this invention is in the field of high temperature paints and varnishes. For example, the excellent water resistance of the materials of this invention makes them applicable for use in coating cans. In addition, the material may be mixed with pigment and employed in a paint.

If it is desired to prepare an air drying varnish, the resins of this invention can be spray-dried in order to remove the high boiling solvent employed in the reaction, and thereafter redissolved in volatile solvents such as acetonebutylacetate and other low boiling ketones, esters and tertiary amines. It should be understood, of course, that both in this use and the other uses that limited amounts of hydrocarbon solvents may be employed if desired.

When these materials are to be employed as air dried paints, it is desirable that the resins be modified with drying oil acids. In such use conventional drying catalysts such as lead, manganese and cobalt naphthalates may be employed.

In addition to the above uses, the resins of this invention, both modified and unmodified may be employed as laminating resins, molding resins and the like. For such uses, the resins may be admixed with conventional fillers, catalysts and mold lubricants.

The alcohol-acid resins of this invention may also be modified by reacting them with silanes of the formula $R_nSiX_{4-n}$ where R and X are as above defined and $n$ has a value from 0 to 4.

The following examples are illustrative only and are not to be construed as limiting the invention which is properly delineated in the claims.

*Example 1*

92 grams of anhydrous glycerine was placed in a reactor and 41.5 grams of terephthalic acid was added. The mixture was agitated and heated to a temperature of about 215° C. as carbon dioxide was passed through the mixture. As soon as all the acid was reacted another portion was added and heating and agitation were continued until that portion had reacted. The process was continued with successive small portions of acid until a total of 166 grams had been reacted with glycerine. After ¾ of the amount had been added, 600 grams of isophorone was added to the reaction mixture to prevent gelation. The last ¼ portion of the acid was added to this solution.

The isophorone solution of the glycerine terephthalic resin was cooled and transferred to another vessel. It was then heated to 170° C. as 148 grams of a partially hydrolyzed phenylmethylsiloxane containing 39.7 per cent by weight isopropoxy radicals based on the weight of the siloxane, was added. The reaction mixture was stirred and heating was continued at 170° C. as successive 300 gram portions of isophorone were added until a total of 2300 grams of the solvent was used. Each portion of the isophorone was added as the viscosity of the material became too high. The reaction was completed within 6 hours after all of the siloxane had been added. During this time approximately the theoretical amount of isopropanol was removed.

The resin mixture was then filtered and the solution was employed to coat No. 24 copper wire which was then passed through a wire tower where is was heated at 350° C. to 420° C. The wire was passed through the tower at a rate of 5 feet per minute. Upon emerging from the tower, a smooth, tough flexible coat was obtained. The suitability of the resin for magnet wire is shown by the following tests: The initial scrape hardness was 18 ounces. The scrape after 24 hours at 100 per cent relative humidity at 35° C. was 18 ounces. Scrape after 1 hour of immersion in toluene at a temperature of 25° C. was 18 ounces. The coated wire was wound around a 100 mil mandrel and after 400 hours at 250° C. there was no sign of failure. The weight loss on the resin was 39.3 per cent after 340 hours at 250° C. By comparison, the same formulation employing phthalic anhydride had a weight loss of 75 per cent in only 192 hours at 250° C.

A .5 mil film of the resin was coated on an Al panel and heated at 250° C. The panel could be bent around a ⅛ inch mandrel without cracking the film after 136 hours at that temperature. The resin film crazed after 880 hours at 250° C.

*Example 2*

A mixture of 46 grams of anhydrous glycerine, and 105.7 grams of terephthalic acid was mixed with 200 grams butyl Carbitol acetate

$(C_4H_9OCH_2CH_2OCH_2CH_2OOCCH_3)$ and the mixture was heated at 245° C. for 3 hours. During that time 22.5 ml. of water was removed. The solution was employed to coat copper wire which was then passed through a wire tower at the rate of 5 feet per minute while the tower was heated at 420° C. The wire emerged from the tower and was tested as follows: The original scrape was 18 ounces. After 24 hours at 100 per cent ralative humidity at 35° C. the scrape was 19 ounces. After 1 hour in toluene at 25° C. the scrape was 18 ounces. The weight loss was 36 per cent after 500 hours at 250° C. The wire was wrapped around a 100 mil mandrel and then heated 400 hours at 250° C. after which the resin showed no sign of crazing.

*Example 3*

46 grams of anhydrous glycerine and 105 grams of isophthalic acid and 200 grams of butyl Carbitol acetate were mixed and heated at 240° C. with stirring for 2½ hours. The solution was coated on copper wire in accordance with the procedure in Example 1 and the resulting wire was tested as follows: The initial scrape was 18 ounces. After the above humidity treatment it was 18 ounces and after 1 hour in toluene at 25° C. it was still 18 ounces.

*Example 4*

A mixture of 46 grams of anhydrous glycerine, 105.7 grams of terephthalic acid, 71 grams of linseed fatty acid and 100 grams of butyl Carbitol acetate were mixed and heated at 255° C. for 2½ hours. The resulting solution was quite viscous and was diluted with xylene to give a solution containing 30 per cent by weight resin. The resulting solution was coated on a wire in the manner of Example 1 and the finished material had an initial scrape of 20 ounces; a scrape after the humidity test of 19 ounces and after 1 hour of immersion in toluene at 25° C. of 20 ounces. The weight loss after 500 hours at 250° C. was 26 per cent.

Example 5

A mixture of 46 grams of anhydrous glycerine, 84.6 grams of terephthalic acid, 71 grams of linseed fatty acid, and 100 grams of butyl Carbitol acetate were mixed and heated 2 hours at 260° C. The reaction mixture was cooled and 20 grams of phenyl triethoxysilane was added. The mixture was agitated and heated 1 hour at 260° C., during which time 14 ml. of ethanol were removed. This material was coated satisfactorily on a wire as shown in Example 1.

Example 6

46 grams of anhydrous glycerine, 83 grams of terephthalic acid and 200 grams of quinoline were mixed and heated at 220° C. to 242° C. for 5 hours, during which time 18 ml. of water were removed. The reaction mixture was cooled to 120° C. and 115 grams of a partially hydrolyzed diphenylsiloxane containing 25.6 per cent by weight isopropoxy groups, which siloxane was dissolved in 39 grams of cresylic acid was added to the reaction mixture. The mixture was agitated and heated up to 225° C. for 3 hours. During this time 37 ml. of isopropanol were removed. The reaction mixture was cooled, filtered and coated on copper wire as shown in Example 1.

Example 7

92 grams of anhydrous glycerine, 166 grams of terephthalic acid, 142 grams of linseed fatty acid and 400 grams of isophorone were mixed and heated to 214–225° C. for 11 hours. During this time 44.5 grams of water were removed. The mixture was cooled to 180° C. and 638 grams of a siloxane resin composed of 33⅓ mol per cent each of phenylmethylsiloxane, monophenylsiloxane and monomethylsiloxane, which resin contained 1.89 per cent by weight silicon bonded OH groups, was added as a 70 per cent toluene solution to the glycerine-isophthalate reaction mixture. Heating was continued at a temperature of 160–218° C. for 5 hours. During the reaction of the siloxane resin with the glycerine-phthalic ester it was necessary to add an additional 150 grams of isophorone and 200 grams of cresylic acid and 100 grams of dimethyl formamide in that order, to the reaction mixture to prevent gelation. During the reaction of the siloxane resin a total of 21.1 grams of water were removed.

The resulting resinous solution was coated on copper wire as described in Example 1 and the resulting wire had an initial scrape of 23 ounces. A scrape of 20 ounces after humidifying and a scrape of 10 ounces after 1 hour immersion in toluene at 25° C.

Example 8

92 grams of anhydrous glycerine, 211 grams of terephthalic acid and 200 grams of butyl Carbitol acetate were heated at 240° C. for 4½ hours. The solution was cooled to 180° C., and 55.5 grams of tetracresoxy silane was added. The mixture was heated to 245° C. for 4 hours. During this time 12 ml. of cresol was removed. The resulting resin was coated on copper wire by the method of Example 1, and the resulting coat had an initial scrape of 20 ounces. This value was maintained after 24 hours at 100 per cent relative humidity and after 1 hour in toluene.

Example 9

A mixture of 46 grams of anhydrous glycerine, 126.9 grams of terephthalic acid and 250 grams of butyl Carbitol acetate was heated to 250° C. for 7¾ hours. During this time 27 ml. of water were removed. This material proved satisfactory for coating copper wire as shown in Example 1. A sample of the resin solution was placed in an aluminum dish and heated at 150° C. for 20 hours. The resin was tack-free at 150° C. but was extremely brittle. After 5 minutes at 250° C. the material was flexible.

Example 10

72.4 grams of pentaerythritol, 148 grams of terephthalic acid, 70 grams of linseed oil fatty acid and 200 grams of butyl Carbitol acetate were mixed and heated at 260° C. with agitation for 7 hours. The resulting resin gives a thermally stable film on metal.

Example 11

110 grams of 96 per cent stilbenedicarboxylic acid, 29 grams of anhydrous glycerine and 200 grams of butyl Carbitol acetate were heated for 16 hours at 240° C. The solution was filtered and coated on No. 24 copper wire in accordance with the procedure of Example 1. After coating, the scrape hardness was 17 ounces and it retained this scrape after 24 hours at 100 per cent relative humidity at 25° C. After 1 hour in toluene at 25° C. the scrape was 15 ounces. The wire was wrapped around a mandrel of 100 mil diameter and heated at 250° C. for 1 week at the end of which time the coating had not failed.

Example 12

92 grams of anhydrous glycerine and 83 grams of terephthalic acid were mixed with 200 grams of butyl Carbitol acetate and heated at a temperature of 238° C. to 249° C. for 1 hour. The material was placed on an aluminum dish and heated at 250° C. for 1½ hours to give a flexible tough film. The material coated satisfactorily on bare copper wire in accordance with the procedure in Example 1.

Example 13

When 92 grams of glycerine, 363 grams of 2,2'-diphenic acid are mixed with 300 grams of dibutyl Carbitol acetate and heated at 240° C. for 24 hours a thermally stable resin is obtained. This material will form a satisfactory wire coating. The above reaction proceeds when diethyleneglycol diacetate is employed as a solvent.

Example 14

A mixture of 92 grams of anhydrous glycerine, 83 grams of terephthalic acid and 70 grams of diethyl Carbitol ($C_2H_5OCH_2CH_2OCH_2CH_2OC_2H_5$) were mixed and heated at 185° C. to 215° C. for 9 hours. During this time 20 ml. of water were removed. The reaction mixture was cooled to 40° C. and 100 grams more of diethyl Carbitol was added. The solution was stirred as a mixture of 163 grams of phenylmethyldichlorosilane and 20.5 grams of phenyltrichlorosilane was added. Hydrogen chloride was evolved. After standing overnight the mixture was heated up to 190° C. for 10 hours. More HCl came off as the viscosity of this material gradually increased. At the end of the heating period 200 grams cyclohexanone was added. The resin solution was coated on copper wire as in Example 1 and the resulting film had an initial scrape hardness of 14 ounces which dropped to 12 ounces after 24 hours at 35° C. in 100 per cent relative humidity.

Example 15

72.4 grams of pentaerythritol, 83 grams of terephthalic acid and 100 grams of dimethyl formamide were mixed and heated from 180° to 215° C. for 21 hours. The mixture was cooled to 90° C. and 148 grams of a partially hydrolyzed phenylmethylsiloxane containing 39.7 per cent by weight silicon bonded isopropoxy groups was added. The temperature was then raised to 150 C. over a period of 4 hours, during which time 46 grams of isopropanol were removed. The resin was then cooled, and 400 grams of dimethyl formamide was added. The resulting solution was filtered and was coated on copper wire, which was then passed through a tower at the rate of 5 feet per minute and heated at a temperature of 420° C. The resulting film had an initial scrape of 18 ounces, and after 24 hours at 35° C. at 100 per cent relative humidity, the scrape was 18 ounces.

Example 16

92 grams of anhydrous glycerine, 124.5 grams of terephthalic acid were mixed and heated from 220° C. to 230° C. for 4 hours. During this time 28 ml. of water were removed. The mixture was cooled to 100° C. and 200 grams of isophorone was added. 223 grams of the partially hydrolyzed siloxane of Example 15 was added and heating was continued at 175° to 209° C. for 3 hours. During this time it was necessary to dilute the reaction mixture with isophorone until a solution containing 17 per cent by weight resin was obtained. This solution was employed to coat copper wire in the manner of Example 1 and the resulting material had an initial scrape of 16 ounces and a scrape of 12 ounces after 24 hours at 35° C. at 100 per cent relative humidity.

Example 17

A mixture of 46 grams of anhydrous glycerine, 41.5 grams of terephthalic acid and 143 grams of cresylic acid were heated at 220° C. for 4 hours. The reaction mixture was then cooled to 160° C. and 154.8 grams of a partially hydrolyzed copolymeric siloxane composed of 70 mol per cent phenylmethylsiloxane and 30 mol per cent monophenylsiloxane and containing 25.4 per cent by weight silicon bonded isopropoxy groups was added to the reaction mixture. The material was heated at 190° C. to 222° C. for 2 hours, during which time 43 grams of isopropanol were removed. The resin solution was then cooled and filtered. The resin solution was employed to coat glass served copper wire and the coating proved satisfactory for a magnet wire. An aluminum panel was coated with 1.2 mil film of the resin and heated at 250° C. The panel could be bent around a ⅛ inch mandrel after 160 hours at that temperature without the film cracking. The panel was heated for 472 hours at 240° C. without any signs of crazing of the film.

Example 18

92 grams of glycerine, 124.5 grams of terephthalic acid and 24.5 grams of maleic acid were mixed and reacted in 400 grams of isophorone by heating 10 hours at 212° C., 41.5 ml. of water were removed. The mixture was cooled to 160° C. and 239 grams of a partially hydrolyzed siloxane composed of 70 mol per cent phenylmethylsiloxane and 30 mol per cent monophenylsiloxane, said siloxane containing 25 weight per cent silicon bonded isopropoxy groups was added together with 300 grams of cresylic acid and 100 grams of dimethyl formamide. Heating at 200° C. was continued for 3 hours during which time isopropanol was removed. The resulting homogeneous resin was satisfactory for coating metal.

Example 19

92 grams of glycerine, 124.5 grams of terephthalic acid, 25 grams of succinic anhydride and 153 grams of a partially hydrolyzed phenylmethylsiloxane containing 38.6 per cent silicon bonded isopropoxy groups were reacted as shown in Example 18. The resulting resin was thermally stable.

Example 20

92 grams of glycerine, 166 grams of terephthalic acid and 101 grams of sebacic acid were reacted in 400 grams of isophorone by heating at 215° C. for 20 hours. The resulting resin was thermally stable.

Example 21

When one mol of glycerine is reacted with one mol of tolanedicarboxylic acid or one mol of dibenzyldicarboxylic acid in the manner of this invention, thermally stable resins are obtained.

That which is claimed is:

1. A method of preparing an electrical conductor for use in electrical equipment which comprises coating the conductor with a solution of a polyester resin of an alcohol selected from the group consisting of glycerine and pentaerythritol, a polycarboxylic acid selected from the group consisting of terephthalic, isophthalic, stilbenedicarboxylic, diphenic, tolanedicarboxylic and dibenzyldicarboxylic acids in amount so that the ratio of OH to COOH radicals is from 4:1 to 1.001:1 and from .1 to 85 per cent by weight based upon the combined weights of the alcohol and carboxylic acids of a siloxane having the formula

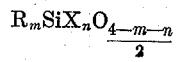

where R is selected from the group consisting of alkyl, monocyclic aryl, alkoxy and aryloxy radicals, $m$ has a value from 0 to 2, $n$ has a value from .05 to 3, and X is selected from the group consisting of alkoxy, aryloxy and silicon-bonded hydroxyl radicals, there being a minimum of .5 oxygen atoms per Si atom, and thereafter curing the film at a temperature of at least 200° C.

2. An article of manufacture comprising an electrical conductor having a resinous coating thereon which coating has been cured at a temperature above 200° C., said coating being characterized by scrap hardness of upwards of 15 ounces, which hardness is maintained essentially unchanged after being subjected for 24 hours to an atmosphere of 100% relative humidity at 25° C. and after immersion for one hour in toluene at 25° C., and said coating being characterized by exceptional heat stability, which coating consists essentially of the reaction product of an alcohol selected from the group consisting of glycerine and pentaerythritol, a polycarboxylic acid selected from the group consisting of terephthalic, isophthalic, stilbenedicarboxylic, diphenic, tolanedicarboxylic and dibenzyldicarboxylic acids, in amount so that the ratio of OH to COOH radicals is from 4:1 to 1.001:1 and from .1 to 85% by weight based upon the combined weights of the alcohol and carboxylic acids of a siloxane having the formula

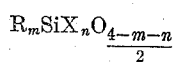

where R is selected from the group consisting of alkyl, monocyclicaryl, alkoxy and arylkoxy radicals, $m$ has a value from 0 to 2, $n$ has a value from .05 to 3, and X is selected from the group consisting of alkoxy, aryloxy and silica-bonded hydroxyl radicals, there being a minimum of .5 oxygen atom per silicon atom.

References Cited in the file of this patent

UNITED STATES PATENTS

| Number | Name | Date |
|---|---|---|
| 1,489,744 | Downs | Apr. 8, 1924 |
| 2,048,799 | Lawson | July 28, 1936 |
| 2,258,222 | Rochow | Oct. 7, 1941 |
| 2,340,109 | D'Alelio | Jan. 25, 1944 |
| 2,465,319 | Whinfield | Mar. 22, 1949 |

FOREIGN PATENTS

| Number | Country | Date |
|---|---|---|
| 363,029 | Great Britain | Dec. 17, 1931 |
| 414,665 | Great Britain | Aug. 7, 1934 |
| 622,671 | Great Britain | May 5, 1949 |
| 650,247 | Great Britain | Feb. 21, 1951 |

OTHER REFERENCES

Hovey et al.: Paint Oil and Chem. Review, pp. 9, 37, 38, 42, January 18, 1940.

Synthetic Organic Chemicals, 12th edition, pages 42 and 44, published 1946 by Carbide and Carbon Chemical Corporation, New York.